(12) United States Patent
Bommarito et al.

(10) Patent No.: US 11,079,340 B2
(45) Date of Patent: Aug. 3, 2021

(54) METHODS OF MONITORING WETNESS UTILIZING A RESONANT CIRCUIT

(71) Applicant: 3M INNOVATIVE PROPERTIES COMPANY, St. Paul, MN (US)

(72) Inventors: G. Marco Bommarito, Stillwater, MN (US); Justin M. Johnson, Hudson, WI (US); Kevin D. Landgrebe, Woodbury, MN (US); Xin X. Wang, Shanghai (CN)

(73) Assignee: 3M Innovative Properties Company, St. Paul, MN (US)

( * ) Notice: Subject to any disclaimer, the term of this patent is extended or adjusted under 35 U.S.C. 154(b) by 1181 days.

(21) Appl. No.: 14/976,451

(22) Filed: Dec. 21, 2015

(65) Prior Publication Data

US 2016/0178538 A1  Jun. 23, 2016

Related U.S. Application Data

(60) Provisional application No. 62/095,814, filed on Dec. 23, 2014.

(51) Int. Cl.
G01N 22/04 (2006.01)

(52) U.S. Cl.
CPC .................... G01N 22/04 (2013.01)

(58) Field of Classification Search
CPC .... G01N 27/225; G01N 27/223; G01N 27/22; G01N 27/02; G01N 27/023; G01N 27/221; G01N 22/04; G01N 21/78; G01N 31/222; G01N 21/81; A61F 13/42; G06K 19/0672; G06K 19/0717; G06K 19/0723; H04B 5/02; H04B 5/0056; A61L 2/07; A61L 2/24; A61L 2/28; A61B 50/30
See application file for complete search history.

(56) References Cited

U.S. PATENT DOCUMENTS

| 4,049,121 | A | | 9/1977 | White |
| 4,406,827 | A | | 9/1983 | Carim |
| 4,554,924 | A | | 11/1985 | Engel |
| 4,777,780 | A | * | 10/1988 | Holzwarth ........... B65D 81/268 53/432 |
| 4,848,353 | A | | 7/1989 | Engel |
| 5,489,624 | A | | 2/1996 | Kantner et al. |
| 5,565,634 | A | * | 10/1996 | Graessle ................... A61L 2/28 422/119 |
| 5,620,656 | A | * | 4/1997 | Wensky ................... A61L 2/28 116/209 |
| 5,745,039 | A | | 4/1998 | Hof et al. |

(Continued)

FOREIGN PATENT DOCUMENTS

| EP | 2 009 432 | 12/2008 |
| EP | 2 437 795 | 4/2012 |

(Continued)

Primary Examiner — Lee E Rodak
Assistant Examiner — Brent J Andrews
(74) Attorney, Agent, or Firm — Qiang Han

(57) ABSTRACT

Methods that include: subjecting an article including a moisture sensor to steam sterilization in a steam sterilizer to produce a sterilized article, the moisture sensor having a moisture absorbing layer and a resonant circuit; subjecting the sterilized article to drying; and interrogating the resonant circuit, wherein the interrogation is affected by an amount of water present in the moisture absorbing layer.

16 Claims, 4 Drawing Sheets

(56) References Cited

U.S. PATENT DOCUMENTS

| | | | |
|---|---|---|---|
| 6,038,464 A * | 3/2000 | Axelgaard | A61B 5/04087 600/391 |
| 6,075,178 A | 6/2000 | La Wilhelm et al. | |
| 6,709,716 B2 | 3/2004 | Uy et al. | |
| 6,774,800 B2 | 8/2004 | Friedman et al. | |
| 6,905,763 B2 | 6/2005 | Crandall et al. | |
| 7,030,631 B1 | 4/2006 | Jennings | |
| 7,456,744 B2 | 11/2008 | Kuhns et al. | |
| 7,948,380 B2 | 5/2011 | Kuhns et al. | |
| 7,999,023 B2 | 8/2011 | Menon et al. | |
| 2004/0043369 A1 | 3/2004 | Pawar et al. | |
| 2004/0070510 A1 | 4/2004 | Zhang et al. | |
| 2006/0174693 A1 * | 8/2006 | Chen | A61F 13/42 73/29.01 |
| 2007/0297940 A1 * | 12/2007 | Brake | A61L 2/07 422/26 |
| 2008/0012579 A1 * | 1/2008 | Kuhns | G06K 19/0717 324/652 |
| 2009/0124990 A1 | 5/2009 | Feldkamp et al. | |
| 2010/0100026 A1 | 4/2010 | Morris | |
| 2010/0139880 A1 | 6/2010 | Vuolanto | |
| 2011/0265820 A1 * | 11/2011 | Dahlberg | B08B 9/0321 134/10 |
| 2012/0000284 A1 | 1/2012 | Yokoyama et al. | |
| 2013/0036802 A1 | 2/2013 | Johnson et al. | |
| 2013/0041334 A1 * | 2/2013 | Prioleau | A61F 13/42 604/361 |
| 2016/0022853 A1 * | 1/2016 | Hajime | A61L 2/07 206/370 |
| 2016/0178538 A1 | 6/2016 | Bommarito et al. | |
| 2016/0187309 A1 * | 6/2016 | Kang | B65B 55/10 436/41 |

FOREIGN PATENT DOCUMENTS

| | | | |
|---|---|---|---|
| GB | 2 178 539 | 2/1987 | |
| JP | 7-174726 | 7/1995 | |
| WO | WO 1997/29789 | 8/1997 | |
| WO | WO 1998/23920 | 6/1998 | |
| WO | WO 2004/004615 | 1/2004 | |
| WO | WO 2008/089189 | 7/2008 | |
| WO | WO 2010/14119 | 12/2010 | |
| WO | WO-2014078088 A1 * | 5/2014 | G01N 31/222 |

* cited by examiner

METHODS OF MONITORING WETNESS UTILIZING A RESONANT CIRCUIT

CROSS REFERENCE TO RELATED APPLICATIONS

This application claims priority to U.S. Provisional Patent Application No. 62/095,814, filed Dec. 23, 2014, the disclosure of which is incorporated by reference in its entirety herein.

BACKGROUND

Within the Central Sterilization (CS) Department of a hospital, medical instruments are cleaned, assembled, processed, packaged, stored, and issued for patient care. Medical instrumentation is received from the Operating Room into the decontamination area of the CS Department. There, instruments are manually washed and disinfected and visually assessed for cleanliness before placing in an automatic washer-disinfector. Once processed in a washer-disinfector, instruments are visually examined before packing and placement in a sterilizer. After sterilization, instruments are stored until needed in the Operating Room.

The time between sterilization and use may range from a few minutes to several weeks, thus the packaging materials and methods must allow for penetration of sterilant (i.e. saturated steam) during the sterilization process as well as protect the instruments from contamination during storage and handling. If the physical, microbial barrier provided by the sterilization packaging is compromised, the set of instruments is considered contaminated and must be reprocessed before use. Having to reprocess an instrument set can have undesired consequences, including decreased productivity in the CS Department and delayed surgeries. In an emergency situation, hospitals may use flash sterilization, a process which, though designed for the steam sterilization of patient care items for immediate use, may put patients at risk for increased surgical-site infections. Thus, reprocessing instruments is considered to be a major problem for Operating Rooms and CS Departments alike.

"Wet packs" are one reason packaged instrument sets may be deemed non-sterile and require reprocessing. An instrument set is considered wet when moisture in the form of dampness, droplets, or puddles of water is observed on or within a sterilization package such as a rigid container, non-woven wrap, peel pouch, or instrument after a completed steam sterilization cycle. Very simply, moisture can act as a vehicle to carry microorganisms inside the pack and contaminate the sterile instruments; making wet packs a significant problem in sterility assurance.

There are several potential causes for wet packs, including improper preparation/configuration of instrument sets, incorrect packaging materials or methods, improper loading of the sterilizer, insufficient drying time, improper cooling methods, poor steam quality, improperly drained steam supply lines, and/or improper cycle selection. Moisture on the outside of packs can usually be detected as soon as the packaged instruments are removed from the sterilizer. Internal pack moisture, however, can remain undetected until the packaged instrument sets are opened at the point of use. It is in this instance where latent internal moisture is discovered at the point of use in the Operating Room, where time and sterility assurance are most critical, that wet packs present the biggest problem. Therefore, there remains a need for better methods of detecting moisture within sterilized articles.

SUMMARY

The present disclosure is directed to methods and articles involving sensing of moisture conditions based on resonant circuit technology in methods of sterilization. The disclosed methods and articles may advantageously allow for methods which can remotely sense moisture, both in a liquid and a vapor state during sterilization processes, for example. The disclosed methods and articles may also allow for use in automated sterilization processes.

Disclosed herein are methods that include subjecting an article including a moisture sensor to a sterilization process to produce a sterilized article, the moisture sensor having a moisture absorbing layer and a resonant circuit; and conducting a first interrogation step comprising interrogating the resonant circuit, wherein the interrogating is affected by an amount of moisture present in the moisture absorbing layer.

Also disclosed herein are articles that include at least one object to be sterilized; and a moisture sensor having a moisture absorbing layer and a resonant circuit, wherein a signal from the resonant circuit can provide information about whether the article is dry.

The above summary is not intended to describe each disclosed embodiment of every implementation of the present invention. The details of one or more embodiments of the invention are also set forth in the description below. Other features, objects, and advantages of the invention will be apparent from the description and from the claims.

BRIEF DESCRIPTION OF DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

In the following description of illustrative embodiments, reference is made to the accompanying figures which form a part hereof, and in which are shown, by way of illustration, specific embodiments. It is to be understood that other embodiments may be utilized and structural changes may be made without departing from the scope of the present disclosure.

As used herein and in the appended claims, the singular forms "a," "and," and "the" include plural referents unless the context clearly dictates otherwise. Thus, for example, reference to "a spacer" includes a plurality of spacers (unless otherwise expressly indicated) and equivalents thereof known to those skilled in the art.

As used herein, "humidity," "wetness," and "moisture" are used interchangeably.

Unless otherwise specified, as used herein, all relative humidity values refer to relative humidity as measured at room temperature (between 22° C. and 28° C.).

Unless otherwise indicated, all numbers expressing quantities of ingredients, viscosities, etc., in the specification and claims are to be understood as being modified by the term "about" in all instances. Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters set forth herein are approximations, the numerical values set forth in the specific examples are reported as precisely as possible. Any numerical values, however, inherently contain certain errors necessarily resulting from the standard deviation found in their respective testing measurements.

Figure 1:
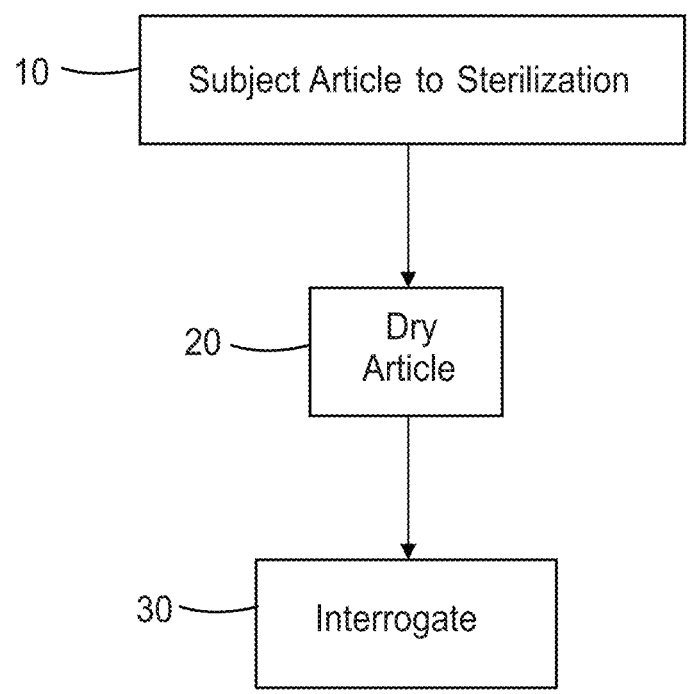
FIG. 1 is a flowchart illustrating embodiments of a disclosed method.

Disclosed herein are methods that can be utilized in conjunction with sterilization processes such as, e.g., steam sterilization, ethylene oxide sterilization, hydrogen peroxide sterilization, and the like. FIG. 1 depicts a flow diagram of an embodiment of disclosed methods. Such methods can include step 10, subjecting an article that includes an electronic moisture sensor to a sterilization process to produce a sterilized article, step 20, optionally subjecting the sterilized article to a first drying step and step 30, interrogating the electronic moisture sensor.

Step 10, of subjecting an article to a sterilization process can be carried out using various methods, processes, machines, articles, or combinations thereof. In some embodiments, a sterilization chamber can be utilized. A sterilization chamber can be of a size sufficient to contain one or more than one article. Sterilant, such as, e.g., steam, ethylene oxide, hydrogen peroxide, etc., may be added to a sterilization chamber after evacuating the chamber of at least a portion of any air or other gas present in the chamber. Alternatively, sterilant can be added to the chamber without evacuating the chamber. A series of evacuation steps can be used to assure that the sterilant reaches all desired areas within the chamber and contacts all desired object(s) to be sterilized, including the article having the electronic moisture sensor.

The moisture sensors and methods of the present disclosure are effective at detecting wet pack conditions that occur following sterilization processes that include humid or moist air conditions, for example in conventional steam sterilization, hydrogen peroxide, ethylene oxide, vapor phase peracetic acid, formaldehyde steam, ozone, vapor phase chlorine dioxide, or vapor phase gluteraldehyde sterilization processes. For example an ethylene oxide sterilization process may occur at relative humidity (RH) levels greater than 50% RH such as those occurring in 3M SteriVac. Hydrogen peroxide sterilization processes such as those accomplished in the STERRAD-NX may occur at humidity levels between, for example, 10-86% RH, at temperatures of 64° F. to 95° F. Chlorine dioxide vapor phase sterilization such as disclosed in European Patent application EP2437795A2, incorporated herein by reference, may occur at humidity levels between, for example, about 5% RH to about 56% RH. Steam sterilization that occurs in a typical autoclave is typically greater than 95% RH. Vapor phase peracetic acid sterilization may occur at humidity levels between, for example, about 20% RH to about 80% RH. Formaldehyde steam sterilization processes typically include a high concentration of gas, temperatures between 60° and 80° C., with a relative humidity of about 75% to about 100%.

The sterilization process to which an article is exposed may be any of the sterilization processes according to conventional methods known in the art, including pre-vacuum and gravity sterilization processes. In some embodiments, the sterilization process comprises steam sterilization, in which an elevated temperature, for example, 121° C., 132° C., 134° C., 135° C., or the like, is included or may be encountered in the process. In addition, elevated pressures may be encountered, for example, 2.8 bar, or the like. Exemplary vacuum depths may include 0.8 bar, or the like. In some embodiments, sterilant, e.g., steam, exposure times can range from 3 minutes to 30 minutes, or the like, depending on the exposure temperatures.

Step 20, optionally subjecting the sterilized article to drying can also be carried out using various methods, processes, machines, articles, or combinations thereof. In some embodiments, a sterilization chamber, e.g., the same one used in step 10, can be utilized. Drying can include control of vacuum, control of temperature, or both. Illustrative drying conditions can generally include post-vacuum depths of 100 mbar ($1 \times 10^4$ Pa). Other drying conditions according to conventional methods known in the art can also be utilized. In some embodiments, drying times can include 10 minutes, 20 minutes, 30 minutes, 40 minutes, 50 minutes, 60 minutes, or more.

Step 30, interrogating the electronic moisture sensor can be carried out using commercially available equipment, equipment specifically made for this step, or a combination thereof. The step of interrogating the moisture sensor can be controlled by a user or can be automated. The step of interrogating the moisture sensor can also be utilized to control, monitor, or time step 20, subjecting the sterilized article to drying. As used herein, interrogating the electronic moisture sensor can include, for example, transmitting a signal to the electronic moisture sensor to obtain a response giving information about identity, condition, etc. Specifics regarding interrogating the electronic moisture sensor can be better explained once the moisture sensor has been more fully explained.

Figure 2:
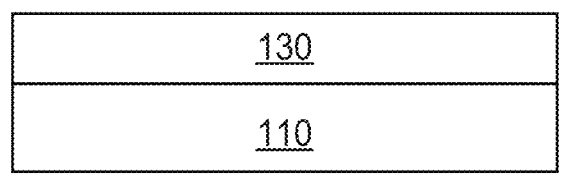
FIG. 2 is a cross-sectional view of one embodiment of a disclosed moisture sensor.

Disclosed methods utilize electronic moisture sensors that include a moisture absorbing layer and a resonant circuit. FIG. 2 shows an illustrative electronic moisture sensor 100. Moisture sensor 100 can include a resonant sensor circuit 110 and a moisture absorbing layer 130. An optional insulative layer (not shown in in FIG. 2) may be disposed between the resonant circuit and the moisture absorbing layer.

The moisture absorbing layer 130 can include any material that can absorb water, in the form of water vapor, liquid water, or both and thereby change the conductivity of the material. In some embodiments, the moisture absorbing layer material can also be described as being conditionally conductive.

Conditionally conductive, when used herein refers to conditionally electrically conductive. It should also be noted that a conditionally conductive layer can be referred to as a conditionally electrically resistive. Conditionally conductive layers may have a first level of conductivity when exposed to a first condition or set of conditions (e.g., moisture conditions) and a second level of conductivity when exposed to a second condition or set of conditions (e.g., moisture conditions). A condition, set of conditions, or more specifically moisture conditions can refer to relative humidity, the presence of water as a liquid, or some combination thereof. For example, in some embodiments, a conditionally conductive layer may have a lower level of conductivity when exposed to lower levels of relative humidity, and a higher level of conductivity when exposed to higher levels of relative humidity. For example, in some embodiments, a conditionally conductive layer may have a lower level of conductivity when exposed to lower levels of relative humidity, no liquid water present on the conditionally conductive layer, or a combination thereof, and a higher level of conductivity when exposed to higher levels of relative humidity, when there is liquid water present on the conditionally conductive layer, or some combination thereof.

In some embodiments, a moisture absorbing layer can respond to a change in moisture conditions. For example, a moisture absorbing layer can change from less conductive (for example, non-conductive) to more conductive (for example, conductive) when the relative humidity of the surroundings change. For example, a moisture absorbing layer can change from less conductive to more conductive (or vice versa) when the relative humidity ("RH") changes some amount or reaches a threshold level of moisture. The change in the relative humidity that alters the moisture absorbing layer from less conductive to more conductive may translate into a change in relative humidity that a moisture sensor containing the moisture absorbing layer can detect.

In some embodiments, the moisture absorbing layer can include one or more polymeric materials, in such embodiments it can be referred to as a moisture absorbing polymeric layer or a conditionally conductive polymeric layer. In some embodiments, a moisture absorbing layer can include more than one layer, e.g., a moisture absorbing layer can be made up of more than two layers of materials (one or more different materials) that together have the properties of a moisture absorbing layer.

Illustrative materials that can be used to construct moisture absorbing polymeric layers can include for example, hydrogels, and polyelectrolytes. In some embodiments, a material (e.g., a polymer) that is electrically conditionally conductive can be utilized. In some embodiments, a material that can be made to be electrically conditionally conductive can be utilized for the moisture absorbing layer. A material, such as a polymer can be made to be conditionally conductive, for example, by the inclusion of a salt. For example, a salt such as sodium chloride (NaCl), potassium chloride (KCl), lithium chloride (LiCl), or any combination thereof can be added to a polymer (or a different material) to render the material conditionally conductive or to enhance the conductivity. In some embodiments, an amount of a salt not greater than 5 wt %, in some embodiments an amount of salt not greater than 3 wt %, and in some embodiments not greater than 2 wt % can be utilized.

An illustrative class of conditionally conductive materials includes hydrogels. As used herein, hydrogels can include hydrophilic polymeric network materials that can absorb large volumes of water without dissolving. It is possible to create hydrogels with varying amounts of water from just a few percent to over 90 percent. The total absorbency and swelling capacity are controlled by the type and degree of cross-linkers used to make the gel. Low-density cross-linked gels generally have a higher absorbent capacity and swell to a larger degree, resulting in soft and sticky materials. High cross-link density polymers exhibit lower absorbent capacity and swell, resulting in firmer materials capable of holding their shape under a mechanical stress. Hydrogels can be formed from natural or synthetic polymers. Compositions of synthetic hydrogels commonly include: polyethylene oxide, polyAMPS, polyvinylpyrrolidone, polyvinyl alcohol, polyacrylomide, polyacrylonitrile, sodium polyacrylate, and other acrylate polymers and copolymers with a significant amount of hydrophilic groups. Compositions of natural hydrogels commonly include: agarose, methylcellulose, hyaluronan, and other naturally derived polymers. Hydrogels can be cross-linked by several methods (for example by exposure to heat, light or another source of actinic radiation) to varying degrees in order to increase their mechanical robustness.

As used herein, a hydrogel can also include colloidal gels with water as the primary dispersion medium that can be considered hydrogels. For example, hydrocolloids can be considered to be a hydrogel. A hydrocolloid is a colloidal system where the colloid particles are hydrophilic polymers uniformly dispersed in water. Depending on the quantity of water, the hydrocolloid can either be a gel or a liquid (sol) and can be either irreversible (single-state) or reversible. For example, agar can exist in a gel and solid state, and alternate between states with heat. Many hydrocolloids are derived from natural sources, for example: agar, gelatin and pectin. Other main hydrocolloids are xanthan gum, gum arabic, guar gum, locust bean gum, cellulose derivatives as carboxymethyl cellulose, alginate and starch. Hydrocolloids are used primarily as a viscosity modifier.

In some embodiments, relevant hydrogels may include those where the water is absorbed and desorbed reversibly. Such hydrogels can be useful in sterilization applications because a typical sterilization cycle will generally include a stage in which water vapor will condense on the surfaces of an instrument pack prior to the optional drying step of the cycle. Thus, it is important for an electronic moisture sensor designed for such an application to include a moisture sensing element that can reversibly detect the presence of water.

An illustrative class of conditionally conductive materials includes polyelectrolytes or polysalts. As used herein, polyelectrolytes are polymers whose repeating units include an electrolytic moiety. Polyelectrolytes are composed of polycations or polyanions or a combination of both. In the presence of water polycation and/or polyanion groups disassociate making the polymer charged. Polyelectrolytes embody the charge properties of typical electrolytes and the rheological properties of typical polymers. The physical properties of polyelectrolyte solutions with water are strongly affected by the degree of charging and the conformation of the polymer. The extent of charging upon dissociation alters the electrical conductivity of the polyelectrolyte. Furthermore, the chain or structural conformation attained by the polyelectrolyte as a result of dissociation and a given degree of charging, will affect many bulk properties (viscosity, turbidity, etc.). Both natural and synthetic polyelectrolytes can be used. Some of the hydrocollloids mentioned above can be considered polyelectrolytes (e.g., pectin, carrageenan, alginates, and carboxymethyl cellulose). Naturally occurring biological polyelectrolytes can include, for example, polypeptides, glycosaminoglycans, and DNA. Examples of synthetic polyelectrolytes include polysodium styrene sulfonate and polyacrylic acid.

Polyelectrolytes may also be used to create more complicated materials known as polyelectrolyte multilayers (PEMs) that can be used as the conditionally conductive layer for some embodiments herein. These thin films are constructed using a layer-by-layer deposition technique in which a given substrate is dipped back and forth between dilute baths of positively and negatively charged polyelectrolyte solutions. During each dip a small amount of polyelectrolyte is adsorbed and the surface charge is reversed, allowing the gradual and controlled build-up of electrostatically cross-linked films of polycation-polyanion layers. These films can also be constructed by substituting charged materials (for example, charged nanoparticles or clay platelets) instead of or in addition to one of the polyelectrolytes. The films can also be created by exploiting hydrogen bonding between polyelectrolytes rather than electrostatic interactions. A useful uniqueness of polyelectrolyte multilayers is that they can be potentially created as a coating directly on an article of interest.

The dielectric properties of conditionally conductive materials, such as hydrogels can vary depending on the amount of water that is absorbed thereby. Such changes in dielectric properties can lead to referring to them as conditionally conductive materials. Changes in these dielectric properties (e.g., electrical conductance) can be measured using several methods. For example, the permittivity (dielectric constant and dielectric loss) of a medium can be measured using ASTM D150 over a given range of frequency, e.g., a range of frequency that is relevant. More specifically, using the ASTM D150 method one can measure the complex permittivity of a conditionally conductive layer material (e.g., a hydrogel) as a function of frequency and water content of the material. The complex permittivity describes how much electric flux is generated per unit charge in the material: the higher the permittivity the higher the electric flux per unit charge. A conditionally conductive layer having a given composition at a given measurement frequency, will have an increasing permittivity with increasing amounts of absorbed water. At some point the absorbed water in the material will be high enough to create a complex permittivity corresponding to an electric flux generated in the material large enough to shield the resonant frequency of a resonant circuit associated with that conditionally conductive layer. At that point the resonant circuit will likely no longer be detectable by a reader or the resonant circuit will no longer be able to receive a radio frequency signal transmitted from a source (e.g., reader) external to the moisture sensor at the resonant frequency of the moisture sensor's resonant circuit.

In some embodiments, a relevant operational frequency, e.g., the frequency at which the resonant circuit resonates, can range from 100 kHz to 20 MHz. This is the range of frequencies that would be used to interrogate the resonant circuit using conventional reader instrumentation. As used herein, to interrogate includes transmitting a RF signal at or near the resonant frequency of the resonant circuit to produce a moisture sensor signal, and receiving the moisture sensor signal transmitted by the resonant circuit, which can include, in some embodiments, a non-signal or a RF signal. Over such an operational frequency range, and with increasing amounts of absorbed water, the complex permittivity of useful conditionally conductive materials varies predominantly in the imaginary component of the permittivity or equivalently varies predominantly in conductivity. Conductivity is related to the imaginary component of permittivity according to the following equation:

$$\sigma = 2\pi f \epsilon_0 \epsilon''$$

where $\sigma$ is the conductivity, f is the operational frequency $\epsilon_0$ is the permittivity of vacuum ($8.85 \times 10^{-12}$ F/m) and $\epsilon''$ is the imaginary permittivity of the material for a given composition and amount of adsorbed water.

Conductivities of materials that may be useful can be characterized using a test method, for example ASTM D150 at a relevant frequency and at relevant relative humidities. In theory, there need not be an upper limit on the conductivity of a useful material at a relative humidity where it is desired that the conditionally conductive layer shield the resonant circuit. The limit of the conductivity of a useful material at a relative humidity where it is desired that the conditionally conductive layer shield the resonant circuit is a level of conductivity high enough to cause the shielding. In theory, there need not be a lower limit on the conductivity of a useful material at a relative humidity where it is desired that the conditionally conductive layer not shield the resonant circuit. The limit of the conductivity of a useful material at a relative humidity where it is desired that the conditionally conductive layer not shield the resonant circuit is a level of conductivity low enough to not cause the shielding.

In some embodiments, useful moisture absorbing layers or conditionally conductive materials may include materials (e.g., hydrogels) with conductivities as low as 0.0001 S/m, in some embodiments as low as 0.001 S/m, or in some embodiments as low as 0.1 S/m as measured using a test method such as ASTM D150 over a frequency range of 100 kHz to 20 MHz, in environments. In some embodiments, useful conditionally conductive materials may include materials (e.g., hydrogels) with conductivities that are infinitely high, in some embodiments as high as 50 S/m, in some embodiments as high as 5 S/m, in some embodiments as high as 0.8 S/m, or in some embodiments as high as 0.5 S/m as measured using a test method such as ASTM D150 over a frequency range of 100 kHz to 20 MHz, in environments. In some embodiments, useful conditionally conductive materials may include materials (e.g., hydrogels) with conductivities ranging from 0.0001 S/m to 50 S/m as measured using a test method such as ASTM D150 over a frequency range of 100 kHz to 20 MHz, in environments varying from 15% to 85% relative humidity.

Illustrative types of materials that can be utilized for the conditionally conductive layer includes hydrogels. Both synthetic and natural hydrogels can be utilized herein. Illustrative specific types can include those found in U.S. Pat. Nos. 4,406,827; 6,038,464; 4,554,924; 5,489,624; 6,709,716; and 7,999,023 for example, the disclosures of which are incorporated herein by reference thereto.

Illustrative specific types of conditionally conductive polymers can include copolymers of hydrogen bond donating monomers and hydrogen bond accepting monomers. For example, specific types of conditionally conductive polymers can include a polymer that includes copolymers of acrylic acid and N-vinylpyrrolidone. Exemplary specific conditionally conductive hydrogels can include, for example the hydrogel adhesive of AG603-6 sensing gel (available from AmGel Technologies a division of Axelgaard Manufacturing Company Ltd. Of Fallbrook, Calif.), the hydrogel adhesive of 3M™ RED DOT™ Resting EKG Electrode 2330 (3M, St. Paul, Minn.).

Moisture absorbing layers may also have optional other properties. For example, moisture absorbing layers may have properties that allow them to function as an adhesive, for example a pressure sensitive adhesive. Moisture absorbing polymeric layers that also have adhesive properties may be beneficial in that they can aid in forming the moisture sensor by maintaining the conditionally conductive layer in contact with adjacent portions of the moistures sensor, with adjacent structures, or both. Moisture absorbing polymeric layers may be modified before use, before being formed into moisture sensors, or after formed into moisture sensors.

Figure 3:
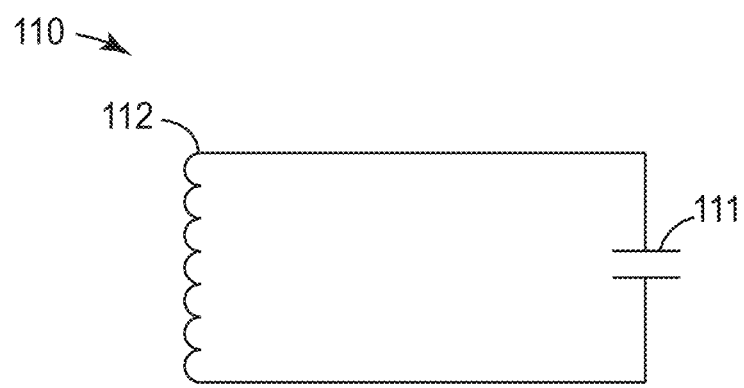
FIG. 3 is a schematic diagram illustrating one embodiment of a disclosed resonant circuit useful in disclosed moisture sensors.

Disclosed moisture sensors, such as that depicted in FIG. 1 as 100 also include a resonant circuit 110. FIG. 3 is a schematic diagram more specifically illustrating an embodiment of a resonant circuit 110 that can be used in disclosed moisture sensors. Resonant circuit 110 includes a capacitive element 111 and an inductive element 112. In some embodiments, a resistive element may also be included in the resonant circuit 110. It is to be understood that, while not shown, the resonant circuit will have some amount of parasitic resistance naturally present in the resonant circuit 110. Circuit 110 is designed to resonate at a specific frequency based on the identities and characteristics of the circuit components 111 and 112. The inductive element 112 acts as an antenna used to receive, reflect, or transmit electromagnetic energy, such as radio frequency (RF) energy. In some applications, additional circuitry (not shown) can be coupled to the resonant circuit 110, such as, e.g., circuitry for outputting an identification code via the antenna. Devices that are capable of transmitting a code are typically referred to as RFID devices. Devices without the additional circuitry for outputting the ID code are often referred to as EAS device.

Illustrative commercially available products that can be utilized as resonant circuits can include, for example those available from ALL-TAG Corporation (Boca Raton, Fla.), Avery Dennison Corporation (Glendale, Calif.), Best Security Industries (Delray Beach, Fla.), Nedap N.V. (Netherlands), TAGIT EAS (Canada), Zhejiang Suntec Electronic Co., Ltd. (Zhejiang, CHINA), and 3M™ ISO RFID tags available from 3M (St. Paul, Minn.). Readers for use with such illustrative tags are known to those of skill in the art and are commercially available. An illustrative commercially available reader is a SenTech 9.5 MHz Portable Hand Verifier, model STC311 from SenTech EAS Corporation (Pompano Beach, Fla.).

Disclosed moisture sensors (such as that illustrated in FIG. 1) can also include an optional insulative layer. The optional insulative layer, if present is located between the moisture absorbing layer and the resonant circuit. The optional insulative layer can function to electrically insulate the resonant circuit from the moisture absorbing layer, from water that may be present in the moisture absorbing layer, or both. In some embodiments, the insulative layer may also have adhesive properties. Insulative layers that also have adhesive properties may be beneficial in that they can aid in forming the moisture sensor by maintaining the insulative layer in contact with adjacent portions of the moistures sensor.

In some embodiments, the optional insulative layer can include any electrically insulative material. In some embodiments, the insulative layer can function to prevent electrical shorting of the resonant circuit itself (once exposed to moisture) or shorting between the resonant circuit and the moisture absorbing layer. In some embodiments, the insulative layer can be a material that has is sufficiently electrically insulative to have a resistance such that the resistance is greater than the volume resistivity of the moisture absorbing layer. In some embodiments, the insulative layer can have an electrical conductivity of less than $1 \times 10^{-8}$ S/m, in some embodiments less than 0.0001 S/m, or in some embodiments less than 0.001 S/m. In some embodiments, the insulative layer can include a material that has adhesive properties and an electrical conductivity of not less than 0.001 S/m. In some embodiments, the insulative layer can comprise air, paper, Teflon, glass, polyethylene (PET), a non-conductive adhesive, or combinations thereof, for example.

Figure 4:
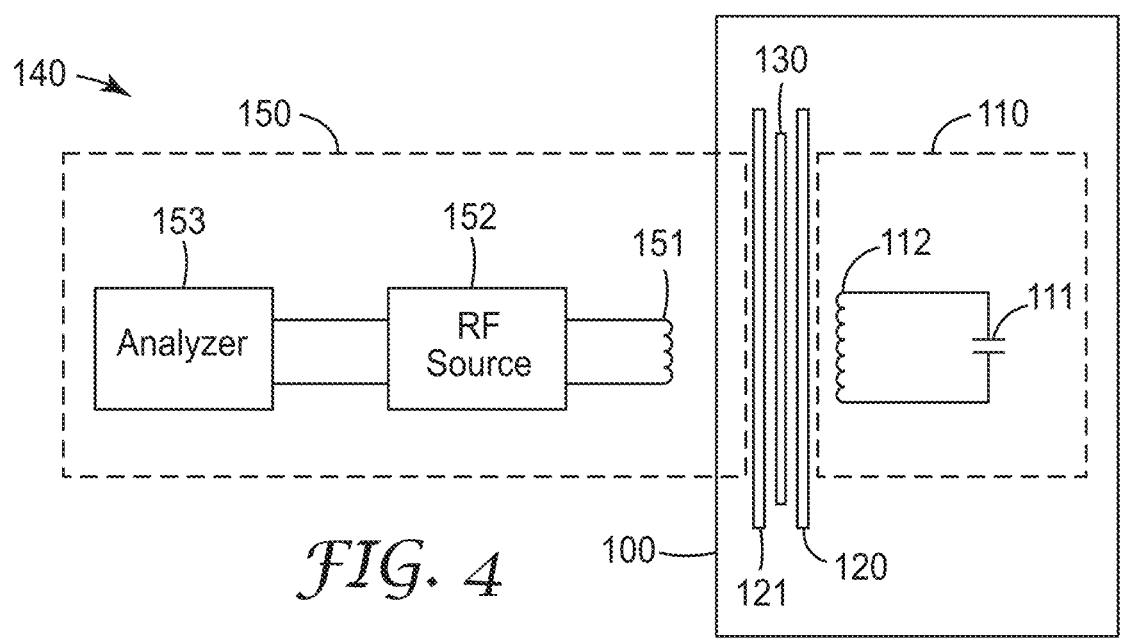
FIG. 4 is a schematic diagram of one embodiment of a disclosed remote sensing system.

FIG. 4 is a schematic diagram of one embodiment of a disclosed remote sensing system 140 that can be utilized in disclosed methods. The remote sensing system 140 includes a reader 150 and a moisture sensor 100 as described above. The reader 150 can be utilized to carry out step 30 (depicted in FIG. 1 above); interrogating the moisture sensor 100. The reader can include a radio frequency (RF) source 152 and an analyzer 153. The reader 150 can also include a reader inductive element 151 that serves as an antenna to transmit an RF signal to the sensor circuit 110. Readers that can be utilized are known to those of skill in the art, and an appropriate reader may be at least partially dependent on particulars of the moisture sensor. An illustrative commercially available reader is a SenTech 9.5 MHz Portable Hand Verifier, model STC311 from SenTech EAS Corporation (Pompano Beach, Fla.).

The moisture sensor, as discussed above includes a sensor circuit 110, which includes at least a capacitive element 111 and an inductive element 112, which absorbs and reflects RF energy near the resonant frequency of the sensor circuit. In some embodiments, the reader can be configured to detect a signal at the frequency at which the sensor circuit 110 transmits. In some embodiments, the reader can be configured to transmit a reader radio frequency signal to the resonant circuit of the moisture sensor at or near the resonant frequency of the resonant circuit, and the reader can be further configured to receive a moisture sensor signal transmitted by the resonant circuit. An optional insulative layer 120 can be disposed between the sensor circuit 110 and the moisture absorbing layer 130, while an optional secondary insulative layer 121 can be disposed between the reader 150 and the moisture absorbing layer 130. In some embodiments, the optional secondary insulative layer can have properties similar to that discussed above with respect to the optional insulative layer of the moisture sensor. In some embodiments, the optional secondary insulative layer can comprise air.

In some embodiments, the step of interrogating the resonant circuit of the moisture sensor can include the reader 150 receiving a signal produced by the sensor circuit 110 in response to a signal transmitted from the reader 150. As such, in some embodiments, the step of interrogating the resonant circuit of the moisture sensor can more specifically be described as the reader transmitting a radio frequency (RF) at or near the resonant frequency of the resonant circuit to excite the resonant circuit within the moisture sensor, i.e. cause the resonant circuit to resonate at or near its resonant frequency. The excitation, or resonating, of the resonant circuit leads to the production of a moisture sensor signal, based on whether or not the moisture absorbing layer is sufficiently conductive to shield the resonant circuit, in response to a signal from the reader. The step of interrogating further may then further comprise receiving, with the reader, the moisture sensor signal from the moisture sensor and generating, with the reader, an indication signal based on the moisture sensor signal received from the resonant circuit. Finally, the interrogating may further include a step of determining the amount of moisture present within the moisture absorbing layer based on the signal generated by the reader. In some embodiments, the moisture sensor signal is selected from a radio frequency signal and a non-signal.

For example, if the moisture absorbing layer is sufficiently conductive to prevent or diminish the resonant circuit's resonance, either by shielding the RF signal transmitted by the reader such that the resonant circuit does not receive the reader's RF signal or receives too diminished of a signal to result in resonating of the resonant circuit, or by shielding any resultant resonation of the resonant circuit (and resultant signal) from reaching the reader, the reader receives a "shielded" moisture sensor signal from the moisture sensor, indicating that the moisture absorbing layer is shielding the resonant circuit. This "shielded moisture sensor signal can, in some embodiments, include a non-signal, or null. The reader can then emit an indication signal for "shielded" moisture sensor signal. If the moisture absorbing layer is not sufficiently conductive to shield the resonant circuit, the resonant circuit will resonate in response to the signal received from the reader and transmit a signal at or near the resonant frequency of the resonant circuit back to the reader such that the reader receives a resonant frequency from the moisture sensor, indicating that the moisture absorbing layer is not shielding the resonant circuit. The reader then generates an indication signal for the moisture sensor signal, e.g., a "non-shielded" moisture sensor signal. An emitted signal from the reader may be one that is audible or visible to a user, or in some cases, lack of an audible or visible signal may also signal a condition to a user.

In some embodiments, a "shielded" moisture sensor signal may comprise a non-signal, or null. In some embodiments, a reader may generate an indication signal which is a non-signal or silence in response to a "shielded" moisture sensor signal. In some embodiments, a "shielded" moisture sensor signal may comprise a radio frequency signal that is diminished from the resonant frequency of the moisture sensor's resonant circuit. In some embodiments, a reader may generate an audible or visible indication signal in response to a "shielded" moisture sensor signal. In some embodiments, a "non-shielded" moisture sensor signal may comprise a radio frequency signal. In some embodiments, a reader may generate an audible or visible indication signal in response to a "non-shielded" moisture sensor signal, while in other embodiments a reader may generate an indication signal which is a non-signal or silence in response to a "non-shielded" moisture sensor signal. In some embodiments, a "shielded" moisture sensor signal, which may indicate the presence of moisture, can result in a non-audible signal or non-visible indication and a "non-shielded" moisture sensor signal, which may indicate the lack of moisture (or the lack of some level of moisture), can result in an audible or visible indication signal generated by the reader.

A non-shielded result can be the result of the moisture sensor never having absorbed the requisite amount of moisture or the moisture sensor having absorbed the requisite amount of moisture but simultaneously having desorbed some level of moisture so that the moisture absorbing layer does not shield the signal transmitted from the reader or the return signal produced from the resonant circuit.

In some embodiments, disclosed methods can detect a moisture condition change, measured by percent relative humidity (% RH) that is less than 10% RH. In some embodiments, disclosed moisture sensors, remote sensing systems, or both can detect a moisture condition change of 5% RH. The percent change in the relative humidity that can be detected may change as the absolute relative humidity of the surrounding conditions change. For example, in some embodiments, a moisture condition change that is less than 10% RH can be detected when the surrounding conditions are at least 50% RH. For example, in some embodiments, a moisture condition change that is 5% RH can be detected when the surrounding conditions are at least 50% RH.

In some embodiments, disclosed methods can detect a threshold level of moisture. Threshold levels can be considered maximum moisture levels or minimum moisture levels, depending on whether a moisture sensor is to be used as determining if something is "wet" or "dry". In some embodiments, disclosed methods can detect, e.g., a moisture absorbing layer can have its conductivity changed, a level of relative humidity that is above a certain level. For example, disclosed methods can detect a relative humidity that is at least 55% relative humidity, at least 58% relative humidity, or at least 60% relative humidity. In some embodiments disclosed methods can detect, e.g., a moisture absorbing layer can have its conductivity changed, a level of relative humidity that is below a certain level. For example, disclosed methods can detect a relative humidity that is not greater than 60% relative humidity, not greater than 58% relative humidity, or not greater than 55% relative humidity. It should also be noted that disclosed moisture sensors can be utilized as reversible or non-reversible moisture sensors in disclosed methods.

In some embodiments, moisture sensors can include moisture absorbing layers that can change from a first level of conductivity to a second level of conductivity when exposed to a relative humidity ranging from 55% to 95% at room temperature. In some embodiments, moisture sensors can include moisture absorbing layers that can change from a first level of conductivity to a second level of conductivity when exposed to a relative humidity that is at least 55%. In some embodiments, moisture sensors can include conditionally conductive layers that can change from a first level of conductivity to a second level of conductivity when exposed to a relative humidity that is at least 58%.

Figure 5:
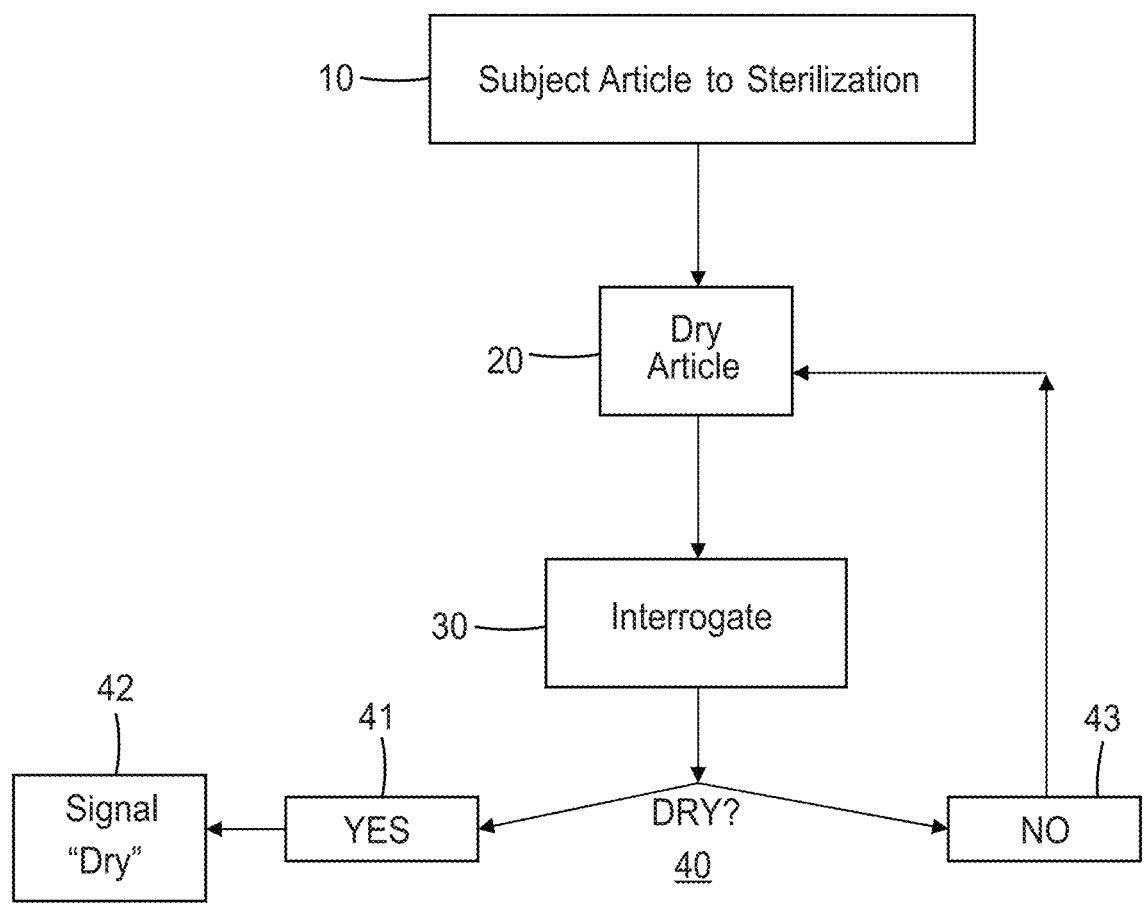
FIG. 5 is a flowchart illustrating embodiments of a disclosed method.

FIG. 5 depicts a flow diagram showing additional embodiments of disclosed methods. The methods depicted in FIG. 5 include step 10, subjecting an article that includes an electronic moisture sensor to a sterilization process to produce a sterilized article, step 20, optionally subjecting the sterilized article to a first drying step, and step 30, interrogating the electronic moisture sensor that was discussed with respect to FIG. 1 above. The disclosed methods also include a decision 40 whether the sterilized article is dry or not. The answer to the question of whether the sterilized article is dry or not is based on whether the reader received a "dry" or "wet" response when interrogating 30 the moisture sensor. If the article is dry (e.g., the reader received a "dry" response upon interrogation or stated another way, the reader received a "non-shielded" response), 41, then the reader can signal "dry" to a user or automated system, 42. If the article is not dry (e.g., the reader received a "not dry" response or no signal in the expected frequency range upon interrogation or stated another way, the reader received a "shielded" response), 43, then the sterilized article can again be subjected to an optional second drying step, 20a. In some embodiments, after some subsequent amount of drying, e.g. an optional second or subsequent drying step, the reader can again interrogate 30 the moisture sensors and the decision 40 whether the sterilized article is dry or not can again be determined. In some other embodiments, a reading of "not dry" can be followed by disposal of the article. Methods such as that disclosed by FIG. 5 could also be useful in an automated system where a processor (e.g., computer) controls and monitors the method.

Disclosed methods could be configured to be utilized as or in an automated process, where the sensor can be monitored to therefore allow automated control of a number of steps and/or conditions. Conditions that can be monitored for can include: does the article include a moisture sensor (e.g., was the article prepared correctly for the sterilization process by including a moisture sensor), has the sensor and/or the article including the sensor become "wet" (e.g., was the article subjected to a requisite level of moisture for the particular sterilization process), and has the sensor and/or the article been sufficiently dried (e.g., if a drying step was present, was the drying step successful).

In some embodiments, an indication of "not-dry" when checking to determine if the sensor and/or article are dry could lead to further (e.g., automatically controlled) drying of the article to be sterilized. A reader (of a disclosed system) could be configured to sequentially check the status ("dry" or "not dry") of the article to be sterilized while drying is occurring in order to most efficiently steam sterilize an article (e.g., no more energy, time, or both would be wasted drying than would be necessary to reach a desired level of dryness). Automated systems could also control the dry time and conditions, control how often sensors are checked, or any combination thereof.

Disclosed methods can be utilized to sterilize virtually any article or type of article. A variety of products and articles, including, for example, medical instruments, devices, and equipment, must be sterilized prior to use in order to prevent bio-contamination of a wound site, a sample, an organism, or the like. Sterilization of items used in medical procedures is vital to minimizing the spread of harmful and infectious agents to patients. Typically, the items used in medical procedures are placed into a container and wrapped with a flexible wrap (e.g., a cloth or sheet) made of a gas-permeable material or the items are placed into a reusable vented rigid container. The sterilization containers are typically designed to preserve sterility of the items contained therein, as well as the interior portion of the containers, after the containers and contents of the container have been subjected to a sterilization procedure.

Articles to be sterilized using disclosed methods include a moisture sensor, such as those described above. Articles to be sterilized can also include other components, including the object or objects to be sterilized and components useful to the process. Object(s) to be sterilized can include, surgical tools, medical devices, dental instruments, dressings, and bandages for example. An object(s) to be sterilized can also include more than one subject object. In some embodiments, a tray holding a plurality of objects can constitute an object to be sterilized and may be part of an article to be sterilized. The object(s) to be sterilized may, for example be disposed in a wrapping material suitable for holding an object to be sterilized. This material can be referred to as a "wrap". A "wrap", as used herein, refers to an article used to substantially surround an object that is to be sterilized. Although the wrap may be fabricated from porous material, it generally functions as a physical barrier to minimize post-sterilization contamination of the object surrounded by the wrap. Thus, as used herein, a "wrapped object" refers to an object substantially surrounded by a "wrap". An object may be disposed in a container (e.g., a tray) before being wrapped.

FIGS. 6a to 6e show an embodiment of a process for wrapping an object to be sterilized. It should be noted that virtually any process for producing an article to be sterilized can be used in conjunction with disclosed methods and the process depicted by FIGS. 6a to 6e is simply one example of a useful process. The particular process of FIGS. 6a to 6e, called an "envelope fold" wrapping process, begins by placing the object 2 to be sterilized (e.g., a metal tray holding medical instruments) onto a suitable flexible wrap 3. By executing a series of folding steps shown in FIGS. 6b-e, the object 2 is enveloped by the wrap 3 to produce the wrapped object 4. Optionally, the process can be repeated with a second wrap (not shown) to produce a double-wrapped object (not shown). The wrapped object 4 or double-wrapped object can be subjected to a suitable sterilization process and, before use (e.g., in a medical procedure), the wrap can be removed from the object.

The wrap can be any material known in the art to be suitable for wrapping objects to be sterilized. The wrap may also advantageously serve as a microbial filter so that after it is sterilized, the wrap-wrapped object can remain sterile until use. The wrap material is thus selected from the group consisting of disposable or reusable materials such as medical grade cellulosic materials (for example paper, etc.); polypropylene or other non-woven polyolefins; linen or muslin, etc; or synthetic wrap (for example GORTEX, Teflon, polyfoil compounds, TYVEK film); or mixtures or blends. In addition, the wrap may be a composite of multiple layers where each layer provides some, but not all, of the desired characteristics. In any embodiment, the wrap material is configured in substantially flat sheets. Advantageously, flat sheets allow for the use of one size sheet for multiple sizes of objects to be wrapped. Furthermore, as the container of the present disclosure provides an outer protective surface for the contents disposed therein, the wrap itself may be a single wrap as opposed to double wrapping or sequential layering of multiple wrap layers.

Figure 6A:
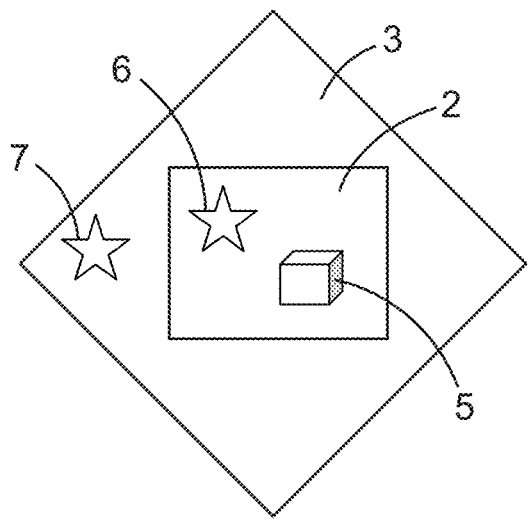
FIGS. 6a to 6e is a set of plan views of an object as it is wrapped with a wrap to produce a wrapped object according to an illustrative method of wrapping an object to be sterilized.
Figure 6B:
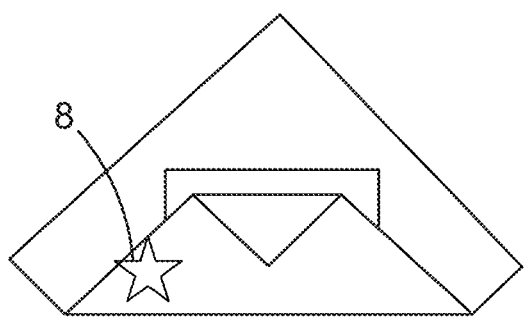
Figure 6C:
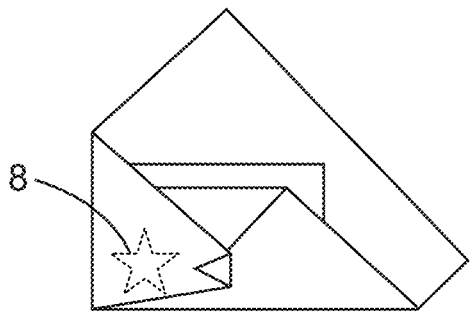
Figure 6D:
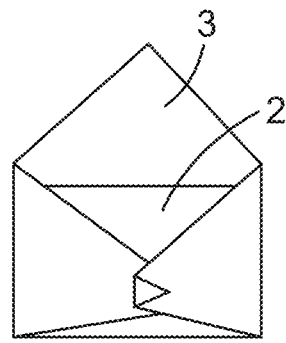
Figure 6E:
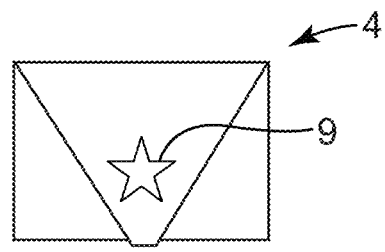

The moisture sensor can be located in various positions on an article. Illustrative locations can include placing one or more moisture sensors on the exterior surface of the top, bottom, or sides of a wrapped sterilization package, or on the exterior surface of a sterilization filter. FIGS. 6a to 6e more specifically describe various possible positions of a moisture sensor within or on an article to be sterilized. For example, a moisture sensor could be located in an instrument tray within a wrapped instrument set (e.g., a moisture sensor could be disposed on the top of a tray, for example sensor 5, with other instruments, etc. before wrapping), could be located on the surface of an instrument tray (e.g., a moisture sensor could be disposed on the surface of a tray, for example, sensor 6 before wrapping), could be located between the wrap and instrument tray (e.g., a sensor 7 placed between the wrap 3 and tray 2), and placing the moisture sensor within the wrap (e.g., between the fibers of the wrap, for example a sensor could be placed between two layers of film that form a wrap—not shown in FIGS. 6a-6e). In some embodiments a moisture sensor could be placed on various portions of the wrap itself. As seen in FIG. 6b, a moisture sensor 8 could be placed on an external surface of the wrap 3 that is still inside the confines of the wrap. As seen in FIG. 6c, once another portion of the wrap is folded, the moisture sensor 8 is inside at least part of the wrap 3. Disclosed methods offer advantages because any one of the locations given by moisture sensor 5, 6, 7, or 8 could be interrogated without having to disturb the wrapped condition of the article. This could allow an article, deemed to be "not dry" upon interrogation to be submitted to further drying without repeating sterilization (if so desired). In some embodiments a moisture sensor could be placed on an external surface of the wrap 3, an illustrative version of this is seen by the moisture sensor 9 in FIG. 6e.

Following are exemplary embodiments of methods and articles according to aspects of the present invention.

Embodiment 1 is a method comprising (a) subjecting an article comprising a moisture sensor to a sterilization process to produce a sterilized article, the moisture sensor comprising a moisture absorbing layer and a resonant circuit; and (b) conducting a first interrogation step comprising interrogating the resonant circuit, wherein the interrogating is affected by an amount of moisture present in the moisture absorbing layer.

Embodiment 2 is a method according to embodiment 1, wherein the interrogating comprises use of a reader comprising a radio frequency source, an analyzer, and a reader inductive element that serves as an antenna to transmit a radio frequency signal.

Embodiment 3 is a method according to any one of embodiment 1 or embodiment 2, wherein the interrogating comprises use of a reader configured to transmit a reader radio frequency signal to the resonant circuit of the moisture sensor at or near the resonant frequency of the resonant circuit, and wherein the reader is further configured to receive a moisture sensor signal transmitted by the resonant circuit.

Embodiment 4 is a method according to embodiment 3, wherein the interrogating comprises: (i) transmitting a reader radio frequency signal from a reader to the resonant circuit of the moisture sensor at or near the resonant frequency of the resonant circuit to produce a moisture sensor signal; (ii) receiving, with the reader, a moisture sensor signal from the moisture sensor and generating, with the reader, an indication signal based on the moisture sensor signal received from the resonant circuit; and (iii) determining the amount of moisture present within the moisture absorbing layer based on the signal generated by the reader.

Embodiment 5 is a method according to any one of embodiments 3 or 4, wherein the moisture sensor signal is selected from a radio frequency signal and a non-signal.

Embodiment 6 is a method according to embodiment 5, wherein the reader receives a non-signal from the resonant circuit if the article is not dry.

Embodiment 7 is a method according to embodiment 6, wherein the reader receives a non-signal from the resonant circuit if the relative humidity in the article is greater than about 60%.

Embodiment 8 is a method according to any one of the preceding embodiments further comprising: (a1) subjecting the sterilized article to a first drying step after subjecting the article to the sterilization process and before interrogating the resonant circuit.

Embodiment 9 is a method according to embodiment 8 further comprising: (c) subjecting the sterilized article to a second drying step after interrogating the resonant circuit.

Embodiment 10 is a method according to embodiment 9 further comprising: (d) conducting a second interrogation step comprising interrogating the resonant circuit after the second drying step.

Embodiment 11 is a method according to any one of the preceding embodiments, wherein the interrogation step or steps is reported to a processor.

Embodiment 12 is a method according to any one of the preceding embodiments, wherein the article comprises the moisture sensor, at least one article to be sterilized and a wrap, the wrap having an outer surface and an inner surface.

Embodiment 13 is a method according to embodiment 12, wherein the moisture sensor is located on an inside surface of the wrap.

Embodiment 14 is a method according to embodiment 12, wherein the moisture sensor is located on an outside surface of the wrap.

Embodiment 15 is a method according to embodiment 12, wherein the article further comprises a tray and the moisture sensor is disposed on the tray.

Embodiment 16 is a method according to any one of the preceding embodiments, wherein the moisture absorbing layer comprises a polymeric material.

Embodiment 17 is a method according to embodiment 16, wherein the polymeric material comprises a hydrogel.

Embodiment 18 is a method according to any one of the preceding claims, wherein the moisture sensor further comprises an insulating layer positioned between the resonant circuit and the moisture absorbing layer.

Embodiment 19 is an article comprising at least one object to be sterilized; and a moisture sensor comprising a moisture absorbing layer and a resonant circuit, wherein a signal from the resonant circuit can provide information about whether the article is dry.

Embodiment 20 is an article according to embodiment 19, wherein the article further comprises one of a rigid container, a flexible container, a non-woven wrap, a peel pouch, a polymeric matrix, paper, and combinations thereof.

Embodiment 21 is an article according to embodiment 20, wherein the at least one object to be sterilized is disposed inside the one of the rigid container, a flexible container, a non-woven wrap, a peel pouch, a polymeric matrix, paper, and combinations thereof.

Embodiment 22 is an article according to embodiment 21, wherein the moisture sensor is disposed inside the one of the rigid container, a flexible container, a non-woven wrap, a peel pouch, a polymeric matrix, paper, and combinations thereof.

Embodiment 23 is an article according to embodiment 21, wherein the moisture sensor is disposed outside the one of the rigid container, a flexible container, a non-woven wrap, a peel pouch, a polymeric matrix, paper, and combinations thereof.

Embodiment 24 is an article according to any one of embodiments 19 to 23, wherein the object to be sterilized comprises at least one surgical instrument.

EXAMPLES

Objects and advantages are further illustrated by the following examples, but the particular materials and amounts thereof recited in these examples, as well as other conditions and details, should not be construed to unduly limit this disclosure.

Unless otherwise noted herein, a SenTech 9.5 MHz Portable Hand Verifier, model STC311 (from SenTech EAS Corporation (Pompano Beach, Fla.) reader was utilized to obtain readings from all sensors herein.

Example 1

Preparation of Moisture Sensors

Moisture Sensor Version 1 (MSV1)

The SL595P sensor label, commercially available from SenTech EAS Corporation, was used to prepare MSV1 of Example 1. The SL595P sensor label is tuned to a frequency of 9.5 MHz and is non-deactivatable; a plain white label compatible with detector devices such as all SenTech 9.5 MHz RF systems as well as any competitive 9.5 MHz RF systems using labels. The SL595P label measures 2.05"× 1.90"(52×48 mm) and is provided rolled in quantities of 2000 labels units per roll. In the Examples below, a reader, a SenTech 9.5 MHz Portable Hand Verifier, model STC311, was used to interrogate the sensors.

MSV1 moisture sensors were prepared as "salt imbibed" sensors in the following manner. The roll of SL595P sensor labels was unwound from the release liner. With the sensor label adhesive exposed face up, sodium chloride (MORTON brand table salt) was shaken onto the adhesive using a particle loading hopper system that vibrated to distribute the sodium chloride onto the adhesive side of the sensor label. The calculated coating weight was 0.5 grams per meter square. After the salt was applied, a paper towel layer was laminated onto the salt coated adhesive. The paper towel used was KIMBERLY-CLARK PROFESSIONAL 01000 SCOTT High-Capacity Towel Roll White Hard Roll Towel slit to 7.6 cm wide. The salt imbibed tags of MSV1 were then rolled up onto a 7.6 cm core.

Moisture Sensor Version 2 (MSV2)

MSV2 was prepared in a similar fashion as MSV1, above, except that sodium chloride salt was not added to the adhesive side of the SL595P label and instead a hydrogel adhesive, AG603-6 sensing gel (available from AmGel Technologies a division of Axelgaard Manufacturing Company Ltd. of Fallbrook, Calif.) was placed in contact with the adhesive surface of the SL595P label. The exposed hydrogel surface was then adhered to a sheet of printer copy paper (STAPLES Copy Paper, Item: 135848 Model: 135848-WH. Framingham, Mass.), and MSV2 sensors were then cut to the size of the original SL595P label sensors.

Moisture Sensor Version 3 (MSV3)

MSV3 was prepared in a similar fashion as MSV2 above, except that the AG-60:3-6 sensing gel hydrogel adhesive was not used. The hydrogel adhesive of 3M RED DOT Resting Electrode 2330 (available from 3M Company, St. Paul, Minn.) was used instead of the AG603-6 sensing gel. The 3M hydrogel was placed in contact with the adhesive surface of the SL595P label. Similarly to MSV2 the exposed hydrogel surface was then adhered to a sheet of printer copy paper and the MSV3 sensors were cut to the size of individual sensors.

Example 2

Detection of MSV1 Before and After Steam Sterilization with Adequate Dry Cycle

MSV1 was placed between two stacks of printer paper cut to 10×10 cm (4×4 inch) dimensions. Each stack was 15 sheets of printer paper, approximately 6.4 mm (0.25 inch) thick held together with two staples on opposite sides of the MSV1. The assembly was placed in the center position of a sterilization wrap (KC600 KIMGUARD ONE-STEP Sterilization Wrap, available from Kimberly-Clark Health Care of Roswell, Ga.) with the salt-imbibed paper towel surface facing "up". An empty aluminum container available from 3M Orthopedics with approximate dimensions 36×23×9 cm (14×9×3.5 inches), used as a surrogate for an instrument tray, was placed on top of the MSV1 printer paper enveloped assembly. The aluminum container was then wrapped in a fashion typically done in preparing an article for sterilization, and taped closed using 3M autoclave tape 1322. A 9.5 MHz RF detector device (SenTech 9.5 MHz Portable Hand Verifier, model STC311 from SenTech EAS Corporation (Pompano Beach, Fla.)) was used to detect the condition of the dry MSV1 copy paper assembly before the sensor was exposed to the sterilization cycle. When the sensor is dry it is functional and an audible "beep" is generated by the detection device.

The wrapped article, comprising the MSV1 copy paper assembly and the aluminum container, was placed into an autoclave ((AMSCO Eagle Series, 3013-C Vacamatic, chamber size: 41×41×66 cm) and subjected to a 132° C., 4 minute steam and 30 minutes dry cycle. After removing the wrapped article from the autoclave, the detector device was used again to verify the MSV1 was dry and functional, as indicated by the audible "beep" sound from the detector. The Example 2 showed that the dry MSV1 could be detected before and after sterilization, indicating a "dry pack" as expected after this adequately dried sterilization cycle.

Example 3

Use of Moisture Sensor to Detect Wet Pack After Steam Sterilization with Inadequate Dry Cycle For Example 3 the same procedure as Example 2 was repeated to prepare a new MSV1 copy paper assembly positioned beneath an aluminum container, wrapped with the KC600 sterilization wrap and taped closed with 3M autoclave tape 1322. The wrapped article was placed into an autoclave (GETINGE Model AC1, chamber size: 66×66×66 cm, obtained from Getinge USA, Inc. of Rochester, N.Y.)) and subjected to a 135° C., 10 minute steam and a 1 second dry cycle. This inadequate drying time was known to result in "wet packs". After removal of the wrapped article comprising the MSV1 assembly, the detection device was used to interrogate the moisture condition of the MSV1. There was no audible "beep" from the detection device, which indicated the pack was "WET".

Next the wrapped article was opened and the wet MSV1 assembly was removed and allowed to air dry overnight. After air drying overnight, the MSV1 assembly was interrogated with the detection device and an audible "beep" signal was perceived, confirming that the sensor was still functional, once fully dried.

Example 4

Use of Moisture Sensor in One of Three Locations to Detect Wet Pack

The ability of the electronic moisture sensor to detect wet packs when placed at various locations in the wrapped article was further tested. The sterilization cycle parameters used in the Example 4 testing included a steam sterilization cycle of 132° C. for 4 minutes followed by a 40-minute dry time. MSV2 sensors were prepared as described above, and tested by placing them at various positions within a wrapped article and under a variety of test conditions and configurations as described below. The following definitions apply to the descriptions used in Tables 2-6, below.

"Load Size" indicated the relative fullness of the sterilization chamber used in the study. The "full" load used a small chambered GETINGE sterilizer (GETINGE Model 410 AC1, chamber size: 41×41×41 cm), which was filled with three items: an unwrapped aluminum rigid container, weighing 5.07 Kg (article 1), and two instrument sets: a small wrapped instrument set (article 2) and a large wrapped instrument set (article 3). The "half" load used a large chambered GETINGE sterilizer (GETINGE Model AC1, chamber size: 66×66×66 cm), which was filled with the same three items: an unwrapped aluminum rigid container (article 1), and two instrument sets: a small wrapped instrument set (article 2) and a large wrapped instrument set (article 3).

"Tray Size" indicated the use of either the small, wrapped 36×23×9 cm aluminum container with no tray, weighing 5.55 Kg, perforated over its surface by 6.4 mm holes (article 2) or the large, wrapped 25×46×13 cm anodized aluminum container, with a tray, weighing 8.33 Kg, perforated over its surfaces by 12.7 mm holes (article 3). One of either article 2 or article 3 included the MSV2 sensors being evaluated, positioned as described below.

"Wrap Type" denoted the use of a single layer of either KC300 KIMGUARD ONE-STEP Sterilization Wrap or KC500 KIMGUARD ONE-STEP Sterilization Wrap (Kimberly Clark).

"Silicone Mat" denoted the use of a silicone mat on which was placed the article (2 or 3) containing the MSV2 sensors.

"Wet Pack Process Step" indicated an additional method used to attempt to induce a wet pack.

One process step was placing the sterilized article onto a metal cart surface at room temperature immediately after the sterilization and dry cycle was complete and allowing the article to stand for 10 minutes before interrogating the MSV2 sensors for wetness. This process step was called "move to cold surface." In another process step a reduced post-sterilization vacuum (0.328 bar) was used during the dry cycle, called "reduced post vacuum pulse." In some instances, "5 min dry time" indicated a 5 minute dry time was used instead of a 40 minute dry time.

"Signal?" indicated YES or NO that an audible "beep" was emitted by the detection device when interrogating the WPSV2 placed at one of the three locations TOP, SIDE or BOTTOM. A result of YES indicated an audible "beep" was perceived and thus the MSV2 was dry and functional. A result of NO indicated an audible "beep" was not perceived and therefore the MSV2 circuit was shielded and the MSV2 was considered wet.

"Top" indicated the MSV2 was placed between the top surface of the sterilization container and a flap of sterilization wrap. Such a flap is a feature of wrapping according to the well-known "envelope style" of packaging instruments for surgery and is used to open the wrapped container in the operating room (OR). As such, the sensor on top lies between a layer of sterilization wrap that covers the top of the metal container and a layer of sterilization wrap that forms a "flap" that serves as a handle for removing the wrap from the container and exposing the container during opening in the operating room.

"Side" indicated the MSV2 was sandwiched between a side panel of the aluminum rigid container and the sterilization wrap such that the printer paper portion of the moisture sensor faced the side of the container.

"Bottom" indicated that the 52×48 mm MSV2 was placed between a linen towel and the bottom of the instrument set; either the small instrument set (article 2) or the large instrument set (article 3) the with the printer paper side of the MSV2 facing "up." The linen towels used were Medline O.R. Towels—Sterile Virgin O.R. Towels, Blue, 41×66 cm (16×26 inches), Pre-Washed, De-Linted, Folded, Packaged & Sterilized, product number MDT2168204, available from Medline Industries Inc. The linen towel, the MSV2 sensor, and metal container being stacked in that order in the center of a flat, open sheet of the select KC sterilization wrap. When wrapped, the bottom portion of the metal sterilization container touched both the printer paper side of the MSV2 and the periphery of the linen towel positioned under the sensor.

"Damp Towel?" indicated the dampness or moisture feel of the linen towel after the sterilization process. The dampness feel is a subjective evaluation. Therefore, in an attempt to correlate the dampness feel to a weight percent change, the following evaluation was performed. Seven identical linen towels were loaded with 7 different amounts of water to create a range of dampness or moisture. A trained sterile processing department (SPD) manager was asked to feel each towel and determine whether the towel would be considered "wet" or "dry", in her facility. The towels were pre-loaded with the following percentage weights of water and stored in closed plastic bags until the assessment. As shown in Table 1 below, the linen towels that had greater than about 6% moisture content (weight water/weight of towel, expressed as percentage) were deemed to be "wet" by the SPD manager.

TABLE 1

| Damp Towel Feel Evaluation | | | | | | | |
| --- | --- | --- | --- | --- | --- | --- | --- |
| | % Water in Towel | | | | | | |
| | 0% | 3.40% | 4.70% | 6.41% | 8.70% | 12.70% | 24.20% |
| Evaluation | Dry | Dry | Dry | Wet | Wet | Wet | Wet |

"Wt % Water in towel" indicated the actual measured weight percent of water in the towel after being processed in the sterilization experiment.

"Determined DRY or WET PACK", indicated if a pack was ultimately considered to be a DRY PACK or a WET PACK based on a plurality of observed results including: visible moisture on the wrap, visible moisture in the tray, dampness (by touch) of the towel, and percent change in towel weight (water absorption). At least 2 of the 4 results needed to indicate moisture in order for a pack to be determined a WET PACK.

TABLE 2

| | Test Conditions and Results of Example 4 | | | | |
| --- | --- | --- | --- | --- | --- |
| CONDITIONS | Example 4A | Example 4B | Example 4C | Example 4D | Example 4E |
| Load Size | full | half | half | full | half |
| Tray Size | large | small | large | large | large |
| Wrap type | KC500 | KC300 | KC500 | KC300 | KC300 |
| Silicone Mat | present | absent | absent | absent | present |
| Wet Pack Process Step | Move to cold surface | Move to cold surface | Move to cold surface | Move to cold surface | Move to cold surface |
| RESULTS | | | | | |
| Moisture on Wrap? | YES | YES | YES | YES | YES |
| Moisture in Tray? | NO | NO | NO | NO | YES |

TABLE 2-continued

Test Conditions and Results of Example 4

| CONDITIONS | Example 4A | Example 4B | Example 4C | Example 4D | Example 4E |
|---|---|---|---|---|---|
| Damp Towel? | NO | NO | NO | NO | NO |
| Wt % Water in towel | 3.4% | 3.6% | 3.7% | 3.5% | 2.8% |
| Signal - Top? | YES | YES | YES | YES | NO |
| Signal - Side? | YES | YES | YES | YES | NO |
| Signal - Bottom? | NO | YES | NO | NO | NO |
| Determined DRY or WET PACK | DRY | DRY | DRY | DRY | WET |

TABLE 3

Test Conditions and Results of Example 4, continued.

| CONDITIONS | Example 4F | Example 4G | Example 4H | Example 4I | Example 4J |
|---|---|---|---|---|---|
| Load Size | half | full | full | full | half |
| Tray Size | small | small | small | large | small |
| Wrap type | KC500 | KC300 | KC500 | KC500 | KC300 |
| Silicone Mat | present | present | absent | present | absent |
| Wet Pack Process Step | Move to cold surface | Move to cold surface | Move to cold surface | Reduced post vacuum pulse | Reduced post vacuum pulse |
| RESULTS | | | | | |
| Moisture on Wrap? | YES | YES | YES | YES | YES |
| Moisture in Tray? | NO | NO | NO | YES | NO |
| Damp Towel? | NO | NO | NO | YES | NO |
| Wt % Water in towel | 2.5% | 2.4% | 2.3% | 4.2% | 1.9% |
| Signal - Top? | YES | YES | YES | YES | YES |
| Signal - Side? | YES | YES | YES | NO | YES |
| Signal - Bottom? | YES | YES | YES | NO | YES |
| Determined DRY or WET PACK | DRY | DRY | DRY | WET | DRY |

TABLE 4

Test Conditions and Results of Example 4, continued.

| CONDITIONS | Example 4K | Example 4L | Example 4M | Example 4N | Example 4O |
|---|---|---|---|---|---|
| Load Size | half | full | half | half | full |
| Tray Size | large | large | large | small | small |
| Wrap type | KC500 | KC300 | KC300 | KC500 | KC300 |
| Silicone Mat | absent | absent | present | present | present |
| Wet Pack Process Step | reduced post vac pulse | reduced post vac pulse | reduced post vac pulse | reduced post vac pulse | reduced post vac pulse |
| RESULTS | | | | | |
| Moisture on Wrap? | YES | YES | NO | NO | YES |
| Moisture in Tray? | NO | NO | NO | NO | NO |
| Damp Towel? | NO | NO | NO | NO | NO |
| Wt % Water in towel | 2.6% | 2.9% | 2.3% | 2.1% | 0.0% |
| Signal - Top? | YES | YES | YES | YES | YES |
| Signal - Side? | YES | YES | YES | YES | YES |
| Signal - Bottom? | NO | NO | YES | YES | NO |
| Determined DRY or WET PACK | DRY | DRY | DRY | DRY | DRY |

TABLE 5

Test Conditions and Results of Example 4, continued.

| CONDITIONS | Example 4P | Example 4Q | Example 4R | Example 4S | Example 4T |
|---|---|---|---|---|---|
| Load Size | full | full | half | half | full |
| Tray Size | small | large | small | large | large |
| Wrap type | KC500 | KC500 | KC300 | KC500 | KC300 |
| Silicone Mat | absent | present | absent | absent | absent |
| Wet Pack Process Step | reduced post vac pulse | 5 min dry time | 5 min dry time | 5 min dry time | 5 min dry time |
| RESULTS | | | | | |
| Moisture on Wrap? | YES | YES | YES | YES | YES |
| Moisture in Tray? | NO | YES | NO | YES | YES |
| Damp Towel? | NO | YES | YES | YES | YES |
| Wt % Water in towel | 2.5% | 44.6% | 16.5% | 32.7% | 43.0% |
| Signal - Top? | YES | NO | NO | NO | NO |
| Signal - Side? | YES | NO | NO | NO | NO |
| Signal - Bottom? | YES | NO | NO | NO | NO |
| Determined DRY or WET PACK | DRY | WET | WET | WET | WET |

TABLE 6

Test Conditions and Results of Example 4, continued.

| CONDITIONS | Example 4U | Example 4V | Example 4W | Example 4X |
|---|---|---|---|---|
| Load Size | half | half | full | full |
| Tray Size | large | small | small | small |
| Wrap type | KC300 | KC500 | KC300 | KC500 |
| Silicone Mat | present | present | present | absent |
| Wet Pack Process Step | 5 min dry time | 5 min dry time | 5 min dry time | 5 min dry time |
| Moisture on Wrap? | YES | YES | YES | YES |
| Moisture in Tray? | YES | YES | YES | NO |
| Damp Towel? | YES | YES | YES | YES |
| Wt % Water in towel | 62.6% | 27.4% | 20.4% | 19.2% |
| Signal - Top? | NO | NO | NO | NO |
| Signal - Side? | NO | NO | NO | NO |
| Signal - Bottom? | NO | NO | NO | NO |
| Determined DRY or WET PACK | WET | WET | WET | WET |

The results of Example 4, shown in Tables 2-6, indicate that the MSV2 can properly indicate a wet pack consistent with manual observations, when placed on either the side or the bottom of the wrapped article.

Example 5

Comparison of MSV2 and MSV3 to Comparative Moisture Sensor CMS1 Comparative Moisture Sensor (CMS1)

Comparative moisture sensor CMS was prepared by using the SL595P sensor label and integrating it with a 5×5 cm portion cut from a commercially available diaper (COMFORT-AIRE brand disposable briefs, size regular, available from Medline Industries Inc.), containing a super absorbent polymer (SAP). The diaper interior side was dry loaded with 500 milligrams of sodium chloride before the adhesive side of the sensor was brought into contact with the salt loaded diaper with SAP.

MSV2 and MSV3 were evaluated under the following conditions to a prepared comparative moisture sensor CMS1. First, the MSV2 MSV3 and CMS1 units were all dried for 16 hours at 45° C. Next, all the MSV2 MSV3 and CMS units were placed together in a large aluminum pan placed in the center of a first humidity chamber at 23° C. and 54% relative humidity and interrogated periodically to determine if each sensor was shielded (or in the case of the CMS1), indicated by the lack of an audible "beep" from the detection device (NON-SIGNAL), or not shielded, indicated by an audible "beep" from the detection device (SIGNAL). Following the first humidity chamber the MSV2 MSV3 and CMS1 units were all transferred immediately to a second humidity chamber at 49° C. and 90% relative humidity and checked after 10 minutes. Finally, after removing all the units from the second humidity chamber and placing them at ambient room temperature and humidity conditions, the CMS1 was confirmed operational to detect liquid by adding 10 mL water directly on the sensor and interrogating with the detection device.

TABLE 7

Results of Example 5, Humidity Chamber Testing

| Time & Conditions | MSV2 1 unit | MSV3 3 units | CMS 2 units |
|---|---|---|---|
| 1 hour @ 23° C. and 54% RH | SIGNAL | SIGNAL | SIGNAL |
| 2 hours @ 23° C. and 54% RH | SIGNAL | SIGNAL | SIGNAL |
| 20 hours @ 23° C. and 54% RH | SIGNAL | SIGNAL | SIGNAL |
| 10 minutes @ 49° C. and 90% RH | NON-SIGNAL | NON-SIGNAL | SIGNAL |
| Direct addition of 10 mL water | — | — | NON-SIGNAL |

The results of Example 5, shown in Table 7, indicates that MSV2 and MSV3 are more sensitive than the CMS1 and can indicate wetness in a high humidity environment, whereas the CMS1 must be in direct contact with liquid water in order to indicate wetness.

Example 6

Comparison of MSV1 and MSV2 to CMS1

Samples of MSV1 and MSV2 and CMS1 were evaluated under the following conditions to compare their respective sensitivity to moisture in the form of % RH and liquid water. First, all the samples were dried overnight in an oven at 45° C. Next, all the samples of MSV1 (2 units), MSV2 (3 units) and CMS1 (1 unit) were placed together (spread out in a large flat aluminum pan) in a controlled humidity chamber at a target percent relative humidity (% RH) of 30% and 25° C., where they were allowed to equilibrate for 48 hours. The controlled humidity and temperature chamber was a model SM-8-3800, available from Thermotron Industries (Holland, Mich., USA). After the equilibration period, the samples of MSV1, MSV2 and CMS1 were all interrogated with the reader/detector and all were dry (non-shielded) and functional, as indicated by the audible "beep" sound from the reader/detector. The chamber setting was then immediately changed to the next target % RH and the samples were allowed to equilibrate until the next reading. This process was repeated, stepping up the % RH and interrogating the samples after a period of equilibration at the set point % RH. The chamber typically reached the target % RH within 20 minutes. Table 8 indicates the conditions and results for Example 6, for MSV1, MSV2 and CMS1. The target % RH test points were 30% RH, 40% RH, 50% RH, 60% RH, 70% RH, and 85% RH. The actual measured % RH as indicated by the calibrated chambers are shown in Table 8. Finally, after exposing all the samples to the highest humidity, the samples were removed from the humidity chamber and the MSV1 and CMS1 sensors were confirmed operational to detect liquid by adding 10 mL water directly onto the sensors and interrogating with the detection device. Only after the direct addition of water did the MSV1 and CMS1 sensors indicate shielding (NON-SIGNAL).

sterilization process is a steam sterilization process, the moisture sensor comprising a moisture absorbing layer and a resonant circuit;
 (a1) subjecting the sterilized article to a first drying step after subjecting the article to the sterilization process and before interrogating the resonant circuit;
 (b) conducting a first interrogation step comprising interrogating the resonant circuit, wherein the interrogating is affected by an amount of moisture present in the moisture absorbing layer; and
 (c) subjecting the sterilized article to a second drying step after interrogating the resonant circuit.

2. The method according to claim 1, wherein the interrogating comprises use of a reader comprising a radio frequency source, an analyzer, and a reader inductive element that serves as an antenna to transmit a radio frequency signal.

3. The method according to claim 1, wherein the interrogating comprises use of a reader configured to transmit a reader radio frequency signal to the resonant circuit of the moisture sensor at or near the resonant frequency of the resonant circuit, and wherein the reader is further configured to receive a moisture sensor signal transmitted by the resonant circuit.

4. The method according to claim 3, wherein the interrogating comprises:
 (i) transmitting a reader radio frequency signal from a reader to the resonant circuit of the moisture sensor at or near the resonant frequency of the resonant circuit to produce a moisture sensor signal;

TABLE 8

Results of Example 6, Additional Humidity Chamber Testing at 25° C.

| Actual % RH | Equilibration hours | MSV1-1 | MSV1-2 | MSV2-1 | MSV2-2 | MSV2-3 | CMS1 |
|---|---|---|---|---|---|---|---|
| 32.8 | 48 | SIGNAL | SIGNAL | SIGNAL | SIGNAL | SIGNAL | SIGNAL |
| 44.2 | 24 | SIGNAL | SIGNAL | SIGNAL | SIGNAL | SIGNAL | SIGNAL |
| 53.0 | 72 | SIGNAL | SIGNAL | SIGNAL | SIGNAL | SIGNAL | SIGNAL |
| 58.2 | 96 | SIGNAL | SIGNAL | NON-SIGNAL | NON-SIGNAL | NON-SIGNAL | SIGNAL |
| 68.2 | 48 | SIGNAL | SIGNAL | NON-SIGNAL | NON-SIGNAL | NON-SIGNAL | SIGNAL |
| 85.8 | 120 | SIGNAL | SIGNAL | NON-SIGNAL | NON-SIGNAL | NON-SIGNAL | SIGNAL |
| water added directly to sensor | N/A | NON-SIGNAL | NON-SIGNAL | Not tested | Not tested | Not tested | NON-SIGNAL |

The complete disclosure of the patents, patent documents, and publications cited in the Background, the Detailed Description, and elsewhere herein are incorporated by reference in their entirety as if each were individually incorporated These and other variations and modifications of the disclosure will be apparent to those skilled in the art without departing from the scope of the disclosure, and it should be understood that this disclosure is not limited to the illustrative embodiments set forth herein. Accordingly, the disclosure is to be limited only by the claims provided below and equivalents thereof.

The invention claimed is:

1. A method comprising:
 (a) subjecting an article comprising a moisture sensor to a sterilization process to produce a sterilized article, the (ii) receiving, with the reader, a moisture sensor signal from the moisture sensor and generating, with the reader, an indication signal based on the moisture sensor signal received from the resonant circuit; and
 (iii) determining the amount of moisture present within the moisture absorbing layer based on the signal generated by the reader.

5. The method according to claim 3, wherein the moisture sensor signal is selected from a radio frequency signal and a non-signal.

6. The method according to claim 5, wherein the reader receives a non-signal from the resonant circuit if the article is not dry.

7. The method according to claim 6, wherein the reader receives a non-signal from the resonant circuit if the relative humidity in the article is greater than about 60%.

8. The method according to claim 1 further comprising: (d) conducting a second interrogation step comprising interrogating the resonant circuit after the second drying step.

9. The method according to claim 1, wherein the interrogation step or steps is reported to a processor.

10. The method according to claim 1, wherein the article comprises the moisture sensor, at least one article to be sterilized and a wrap, the wrap having an outer surface and an inner surface.

11. The method according to claim 10, wherein the moisture sensor is located on an inside surface of the wrap.

12. The method according to claim 10, wherein the moisture sensor is located on an outside surface of the wrap.

13. The method according to claim 10, wherein the article further comprises a tray and the moisture sensor is disposed on the tray.

14. The method according to claim 1, wherein the moisture absorbing layer comprises a polymeric material.

15. The method according to claim 14, wherein the polymeric material comprises a hydrogel.

16. The method according to claim 1, wherein the moisture sensor further comprises an insulating layer positioned between the resonant circuit and the moisture absorbing layer.

* * * * *